United States Patent Office 3,148,069
Patented Sept. 8, 1964

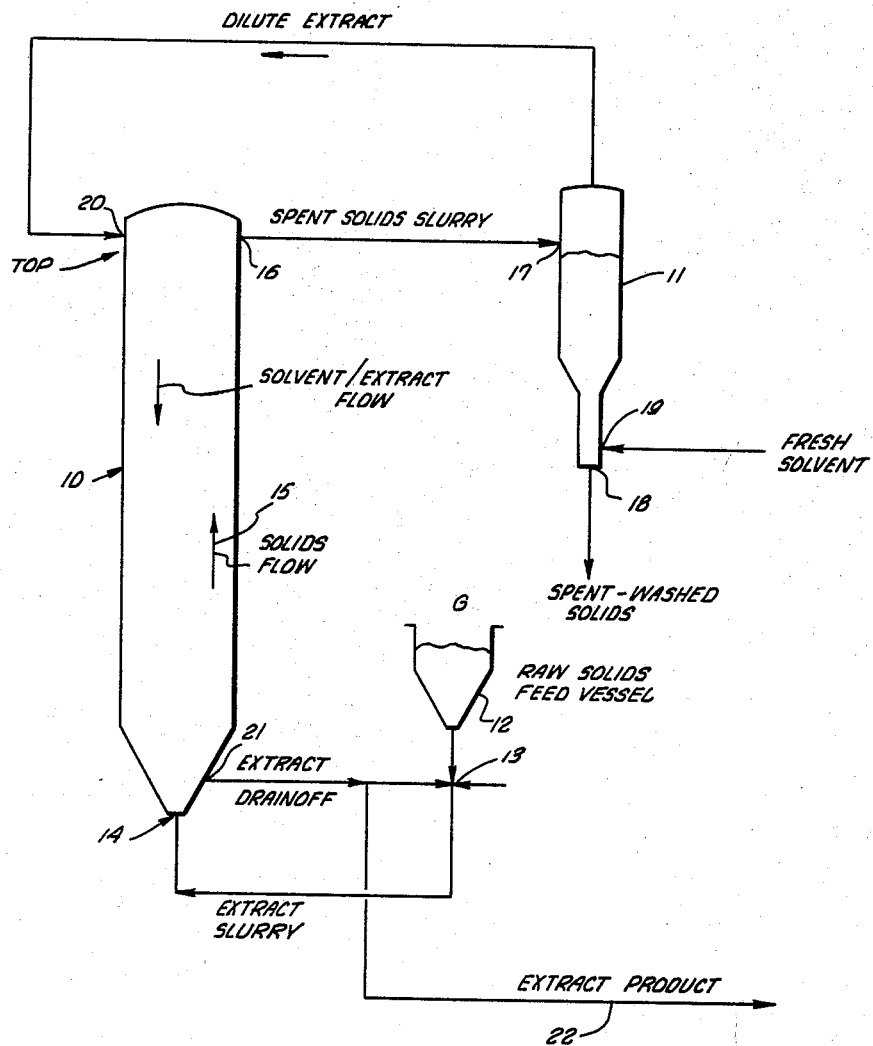

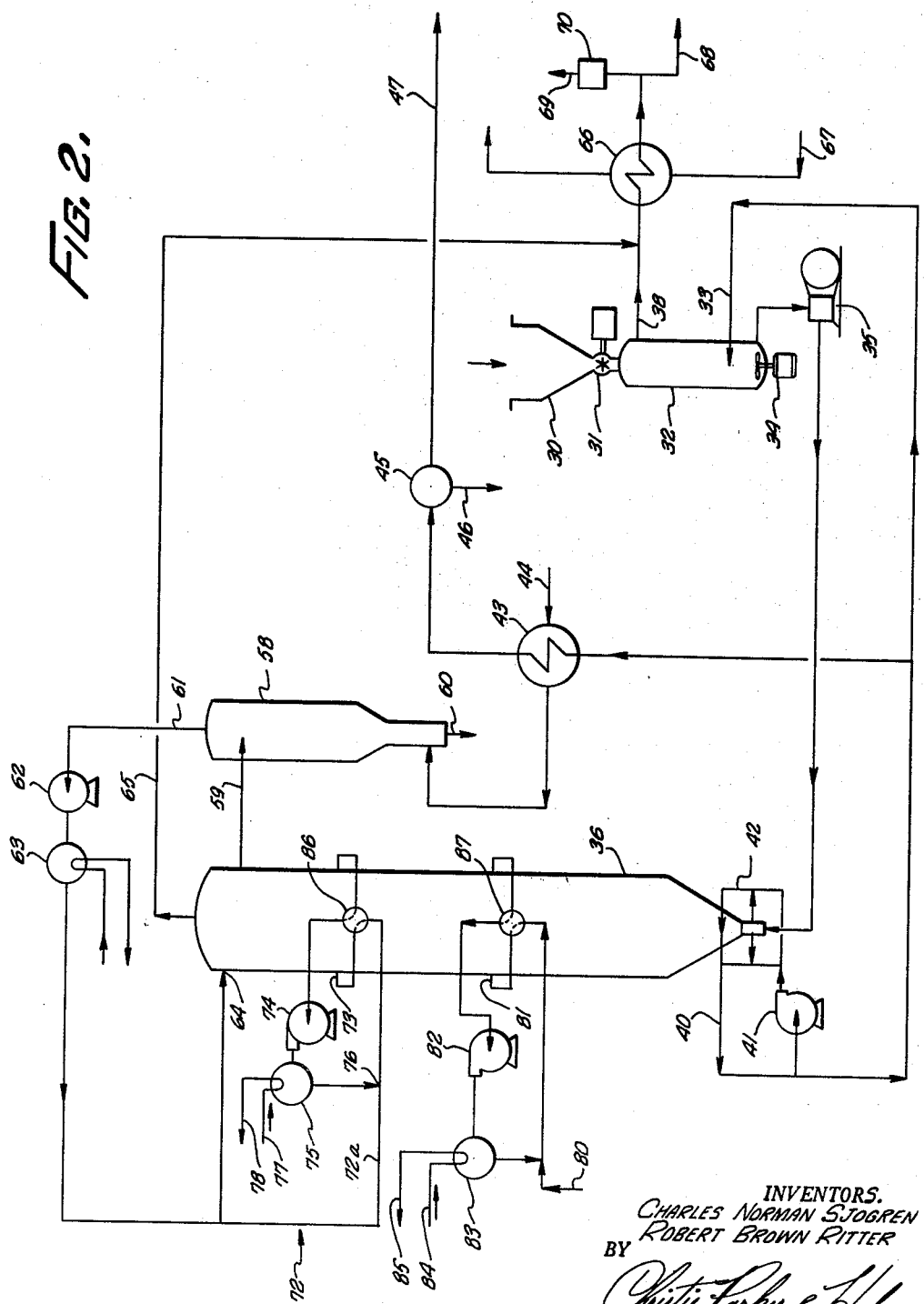

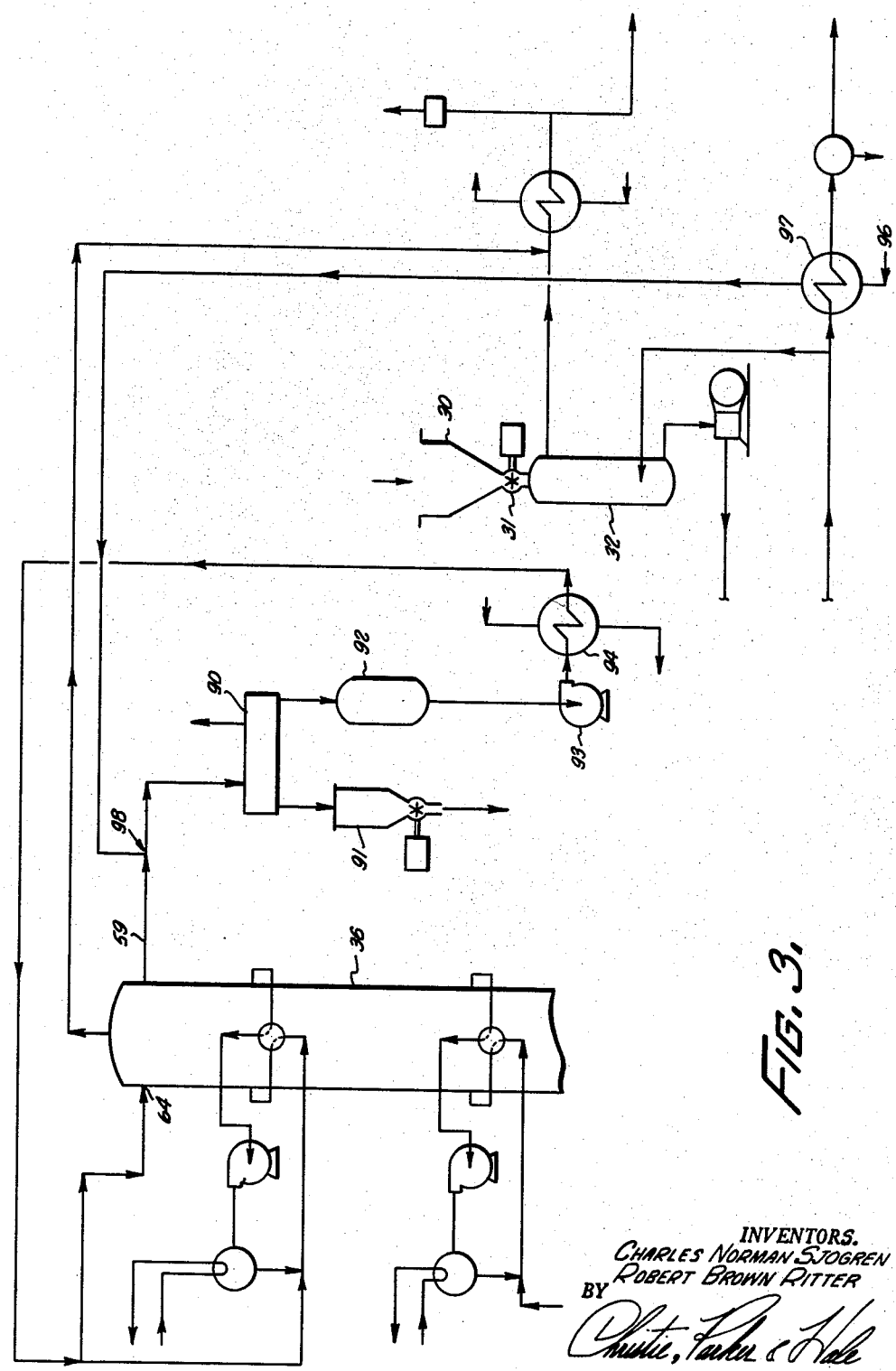

3,148,069
LIQUID-SOLID EXTRACTION PROCESS
Charles Norman Sjogren and Robert Brown Ritter, San Gabriel, Calif., assignors to Chemet Engineers, Inc., Pasadena, Calif., a corporation of California
Filed June 13, 1960, Ser. No. 35,612
9 Claims. (Cl. 99—71)

This invention is directed to a continuous process for the recovery of soluble components from particulate solids with particular application to the specific adaptation of the generalized process to the continuous water extraction of the soluble components from coffee beans.

Conventional liquid-solid extraction processes involving the solvent extraction of the soluble solids content, or an equilibrium portion thereof, of a raw solid material from the insoluble components are carried out in single or multiple batch procedures. Certain processes have been carried on where such solid extraction can be carried out on a theoretically continuous basis at ambient pressures, but there is no known process for true continuous extraction of soluble solid components from solids at superambient pressures.

Although the process of the invention is in no way limited to the production of coffee extracts, it is specifically suited to such use and is accordingly conveniently described relative thereto.

To date the extraction of the soluble components of coffee beans has been accomplished in one of several different methods: (1) Single batch; single contact as exemplified by dripolator or silex type operation, (2) single batch; multiple contact as exemplified by percolator, and (3) a multibatch method. The multibatch method is the only method presently in use for commercial production of coffee extracts, commonly referred to as "instant" coffee. It is necessary in the production of coffee extracts to use high temperatures and pressures so as to recover and hydrolize the solids not otherwise normally or necessarily extracted in brewing coffee by the cup. It is because of these required high temperatures and pressures that a successful continuous method in which fresh solids may be continuously introduced to a system, subjected to solvent treatment and subsequently discharged as spent material has been difficult to develop. One recent literature reference has recognized that a continuous procedure of this type is the "Instant Coffee System of Tomorrow" (Tea and Coffee Trade Journal, November 1958, page 23).

We have now developed a truly continuous system for the extraction of soluble components of solid materials which is characterized by the introduction and removal of the solid material in particulate form into and from a solvent extraction chamber in the form of a slurry. A slurry is conventionally, and for purposes of this specification, defined as a suspension of solids in liquid in such proportion that the resultant agitated mixture has the properties of a liquid. In general terms, the process of the invention comprises introducing a slurry of the particulate solid material and liquid extract from the process into one end of a vertically oriented extraction vessel, introducing suitable solvent into the other end of the vessel, causing the solids and solvent to move continuously and removing spent solids and extract from the ends respectively opposite the points of introduction of solids and solvent, a portion of the removed extract being recycled into the vessel as the liquid phase of the feed slurry. The process of the invention is readily described in relation to the accompanying drawing, in which:

FIG. 1 is a flow sheet of the basic elements of the process applicable to the extraction of soluble components from any solids containing the same;

FIG. 2 is a more detailed flow sheet of the process as applied to the production of coffee extracts; and FIG. 3 is a flow sheet of an alternate system for extraction of the soluble coffee components.

Referring to FIG. 1, the process of the invention as briefly stated above is accomplished in the manner shown in this drawing. The extraction plant shown in this figure includes a primary extraction vessel 10, a spent solids recovery vessel 11, and a raw solids feed vessel 12 together with suitable interconnecting piping. The obviously necessary pumps, heat exchangers and the like for commercial application are not shown in this figure for purposes of simplifying the description and understanding of the procedure.

Particulate solid material is withdrawn from the vessel 12 and mixed at 13 with a portion of the extract removed from the lower part of the vessel 10. The mixture of particulate solids and extract is introduced at 14 as a slurry into the lower end of the vessel 10. An important feature of the invention is that the raw solids are slurried for introduction into the extraction chamber by means of a relatively conventional pump (not shown). This permits a pressure seal enabling operation of the extraction vessel at superambient pressures. Further of importance is the fact that the liquid phase of the feed slurry is derived from a part of the extract obtained in the extraction column. This procedure has the advantage of avoiding extract dilution at the point of solids flow into the column and also providing an initial heat transfer to the raw feed.

Practically immediately upon entry into the vessel 10, the solids are permitted to settle out of the slurry so that the vessel is substantially filled with an upwardly moving bed of solids, displacement therein being produced by the forced introduction of the slurry fed adjacent the bottom thereof. The solids migrating up the vessel 10 in the direction indicated by arrow 15 are countercurrently contacted with solvent flowing downwardly in the vessel.

The parameters of temperature, pressure and solids residence time in the vessel 10 are easily controlled, so that solids removed from the vessel at 16 are substantially spent, i.e. the desired proportion of soluble components have been extracted therefrom. The spent solids are introduced at 17 into the upper end of wash vessel 11, moving downwardly therein as the spent and washed solids are removed at 18 from the lower end of the vessel. Fresh solvent is introduced into the lower end of the wash vessel 11 at 19, flowing upwardly therein countercurrently to the spent solids so as to give the spent grounds a final wash and to recover heat by direct contact with the grounds, the resultant dilute extract flowing from the upper end of the wash column 11 into the upper end of extraction vessel 10 at 20.

The rate of solvent flow into the vessel 20 is controlled so that a part thereof can be recycled as a suspension medium for transferring spent solids as a slurry through outlet 16 from the extraction vessel to the washing vessel. The fresh solvent introduced to the extraction vessel and not by-passed for removal of solids percolates through the upwardly moving solid bed extracting soluble components in the process. The resultant extract is drained from the extraction vessel at 21 and part is mixed with the solids, as previously described, at 13, and part is removed as product through line 22.

The conditions of temperature, pressure, particle size of the feed, type of solvent, as well as other operating variables may be selected in relation to the solids involved and the soluble components desired. For this reason one embodiment of the process can be described in somewhat greater detail as specifically applied to the extraction of soluble coffee grounds from coffee beans as used for the purpose of manufacturing coffee extract.

For the purpose of describing a completely operable embodiment of the invention, but not as any limitation thereof, FIG. 2 is described in some detail including typical flow rates, temperatures, pressures and the like. If the process is operated under the conditions specified in the description of FIG. 2, a usable coffee extract will be produced. However, all coffee extract producers have their own ideas of the type of end product desired, proper roasted coffee blend to be extracted, and the like, so that the operating variables described with relation to FIG. 2 can be considered only as typical and will understandably be varied over wide limits in commercial application.

Ground roasted coffee is supplied to feed storage hopper 30 at a temperature of approximately 80° F., this being considered typically ambient temperature in areas where soluble coffee plants are installed, and is fed through a rotary feeder 31 into a slurry vessel 32. If the feed rate of granular coffee into vessel 32 is approximately 1435 pounds per hour, this will represent approximately 844 pounds of insoluble solids, 563 pounds of soluble solids, and 28 pounds of water. As previously described in relation to FIG. 1, a portion of the extract produced in the process is introduced into the slurry vessel 32 through line 33 at the rate of approximately 2854 pounds per hour, equivalent to about 5.4 gallons per minute. The pressure of the extract is dropped to essentially ambient as it enters vessel 32 at a temperature of about 212° F. The solids and liquid extract introduced into the vessel 32 are slurried therein by means of an agitator 34 and pumped by pump 35 into the lower end of extraction column 36. The slurry feed introduced to the bottom of column 36 is substantially the aggregate bulk of solids and extract introduced to the slurry vessel 32, and enters the extraction column at a temperature of 212° F. and a pressure of 195 p.s.i.g. A certain amount of steam is flashed from the extract in the slurry tank and is removed through an essence vapor line 38 in the amount of approximately 18½ pounds per hour and at ambient pressure.

As previously described, the feed slurry loses its characteristics as a slurry almost immediately upon introduction into the column 36, solids moving upwardly in the column as a moving bed. This is a desirable condition so as to insure orderly countercurrent flow of solids and liquid through the column, and is brought about by removing all extract from the column at a controlled rate. Accordingly, there is a minimum of agitation of the solids in the column so that all of the solid material entering the column is subjected to substantially the same uniform countercurrent extraction of solvent flowing downwardly therein.

Solvent extract is removed from the column through line 40, a small part thereof being periodically recycled by pump 41 through the recycle network 42 solely for the purpose of counterwashing the screens through which the solvent is withdrawn from the column. As previously described, a portion of the extract is introduced into the slurry vessel 32 through line 33. The remaining portion of the extract, representing approximately 1800 pounds per hour, is passed through heat exchanger 43 to interchange heat with fresh soft water feed introduced into the system at 44. Water is introduced at approximately 2800 pounds per hour at a temperature of about 75° F. and at a pressure of 185 p.s.i.g. After passing through the heat exchanger 43, the feed water is warmed to a temperature of 123° F. and is at a pressure of 180 p.s.i.g., the extract at the same time being cooled in the heat exchanger to a temperature of about 90° F. The cooled extract is then passed through a fines removal unit 45 which may be a filter or centrifuge to remove whatever trace quantities of solid materials remain in the extract, these being withdrawn at 46, and the cooled, substantially solid-free extract being recovered from the process at 47.

Following to the feed water after passage through heat exchanger 43, it is introduced to the lower end of a spent solids wash vessel 58 in which it flows countercurrently to spent solids removed from the extraction column. These solids enter the wash vessel at 59 at a temperature of about 360° F. and are removed from the vessel at 60 at a temperature of about 125° F. The feed water replaces extract in the solids interstices, washes a certain amount of extract from the grounds and recovers heat from the grounds before they are discharged. A portion of the feed water flows out of the vessel with the spent grounds.

That portion of the feed water which is not discharged with the spent grounds emerges from the vessel at 61 as a dilute extract and at a temperature of approximately 315° F. and a pressure of 175 p.s.i.g. Dilute extract feed is pumped by pump 62 through a feed heater 63 from which it emerges at a temperature of 365° F. into the upper end of the extraction column at 64. By recovering the heat of the grounds with feed water and operating the wash vessel at essentially extraction column pressure a tremendous horsepower and B.t.u. saving is realized over a depressurized discharge.

As described with relation to FIG. 1, a portion of this dilute extract feed is employed to carry spent grounds in the form of a slurry from the upper portion of the extraction column into the wash vessel 58 and is recycled in this fashion. This transport is generally mechanical in nature, solids being simply carried from the extraction vessel to the wash vessel by the action of fluid flow.

Any gases produced in the extraction column are removed through line 65 and combined with the vapors removed from slurry tank 32 through line 38. These combined vapors are cooled in heat exchanger 66 by cold water introduced at 67 producing a condensed essence 68, the condensing system being vented to atmosphere at 69 through a cold trap 70.

The extraction column may be so designed to permit control of operating conditions over a wide range of parameter variation. As illustrated, it is possible to control the temperature profile of the column through the liquid recycle heating system 72. This system provides means for introducing a portion of the liquid feed at 73 as well as means for withdrawing liquid from the column by means of pump 74 passing it through heat exchanger 75 and back into the column inlet at 76. Steam may be introduced into the heat exchanger 75 through line 77 and condensate removed at 78. Any number of stages of solvent flow control may be employed along the length of the column, as well as simple temperature control by solvent recycling, as shown. Close control of the temperature profile and solvent-solid ratios throughout the length of the column enables quite exacting control of the extent of recovery and hydrolysis of the solubles.

The ratio of extraction liquid to solids as well as solubles equilibrium in the solvent may be further varied by introduction of fresh heated water at one or more stages. In the drawing, this may be accomplished by introducing fresh feed (dilute extract) at 73 through line 72A, or by introducing water at 80, which water may be derived from the upstream side of the heat exchanger 43. The water fed from 80 is introduced to the column at 81 and any amount of liquid may be withdrawn from the column at this stage and pumped by pump 82 through exchanger 83 for return flow into the inlet 81. Exchanger 83 is provided with cooling water from line 84. Rotating valve 86 in the system 72 and rotating valve 87 in the auxiliary solvent feed system 80 are shown schematically only to indicate the possibility of periodic reverse flow for cleaning the fluid exit screens in the system.

The temperature of operations may be controlled and varied with a considerable degree of flexibility. If heat is added at intermediate points such as 73 and not subsequently removed as at point 81, the entire temperature level of the column will be raised. On the other hand, by adding heat at certain points such as 73 and removing equivalent heat at point 81, the temperature profile can be varied without changing the terminal temperatures. The temperature control and solvent control systems permit a greater product quality flexibility and a wider raw material variation tolerance than is possible in the conventional multistage batch operation.

FIGURE 2 has been described with solids first at the bottom and solvent at the top to result in a countercurrent flow of solids upwardly and solvent downwardly in the extraction column. Although the solids are introduced and removed from the column in a slurry, their movement in the column is as a stable bed. For this reason it is entirely feasible, if desired, to reverse the operation so as to introduce solids at the top and fresh solvent at the bottom, produce a countercurrent downward flow of solids and upward flow of solvent, so that spent solids are removed at the bottom and extract at the top. No significantly different apparatus is necessary for such reverse flow operation and separate illustration of such procedure would add nothing to the understanding of the invention.

A modification of the system of FIG. 2 is shown in FIG. 3. For the most part, the plant shown in FIG. 3 is substantially identical to that shown in FIG. 2, and like portions are given like numbers, and the description will not be repeated in its entirety. The difference lies largely in the treatment of the spent solids removed from extraction column 36 through line 59. In the FIG. 3 embodiment, these solids are introduced into a centrifuge 90 with the grounds passing from the centrifuge into a discharge hopper 91 and extract from the centrifuge into a surge tank 92. The extract removed from the centrifuge 90 passes from surge tank 92 through pump 93, heat exchanger 94 and into the column feed 64. Fresh make-up water is introduced to the system at 96, interchanged with the extract product in exchanger 97, and flows into the column discharge 59 at 98 to act as a quench for the hot liquid from 59 and to augment the liquid carrier for the solids into the centrifuge.

Conventionally, the extract from a soluble coffee plant is fed to a flash drying system which is neither described nor illustrated herein as it forms no part of the present invention. For economic operation, and to obtain maximum solids yield in this drying operation, it is necessary that a fairly high solids content in the extract be obtained. Under such circumstances, it is advisable to operate the extraction column to obtain a maximum of extraction and hydrolysis, although the principal aromatic and flavor components are the most readily extracted of the solids. If the coffee extract is to be handled in a different way, a different operation of the process may be desirable. For example, because of the flexibility of operating conditions possible in our process, it is possible to freeze the extract. If this treatment is employed, the extraction column may be operated at high flow rates and otherwise under conditions in which a smaller than normal proportion of the soluble solids are extracted from the coffee bean, maximum bulk and hydrolysis of solids being unnecessary as in the flash drying procedure.

It is to be understood that the process of the invention, although particularly suited to coffee extraction, is not so limited, and may find application in sugar beets and the like and is likewise not limited to the use of water as a solvent.

We claim:

1. A continuous process for the solvent extraction of soluble components from ground coffee beans to form a liquid coffee extract which comprises introducing ground coffee into a first vessel, pumping liquid coffee extract into the first vessel to form a feed slurry with the ground coffee, introducing feed slurry under pressure to the lower part of a second and vertically oriented vessel causing the solids to flow upwardly therein as a moving bed, introducing solvent at superambient temperature and pressure into the upper part of the second vessel, removing a part of the introduced solvent and spent solids from the upper part of the second vessel as a slurry, separating the removed spent solids from the removed solvent without substantially reducing the pressure of the solvent and recycling the solvent to the upper part of the first vessel, a portion of the solvent introduced into the second vessel flowing downwardly therein countercurrently to the moving bed of coffee solids to extract the solubles therefrom, removing extract from the lower part of the second vessel, and reintroducing a portion of the extract into the first vessel as the liquid phase of the feed slurry.

2. A continuous process for the solvent extraction of soluble components from ground coffee beans to form a liquid coffee extract which comprises introducing ground coffee into a first vessel, pumping liquid coffee extract into the first vessel to form a feed slurry with the ground coffee, introducing feed slurry under pressure to the lower part of a second and vertically oriented vessel, causing the coffee solids to flow upwardly therein as a moving bed, introducing solvent at superambient temperature and pressure into the upper part of the second vessel, removing spent solids from the upper part of the second vessel as a slurry with a part of the introduced solvent, the remaining part of the solvent introduced into the second vessel flowing downwardly therein countercurrently to the moving bed of coffee solids to extract the solubles therefrom, removing extract from the lower part of the second vessel at such a rate as to settle solids out of the feed slurry closely adjacent the point of introduction of the feed slurry, and reintroducing a portion of the extract into the first vessel as the liquid phase of the feed slurry.

3. A continuous process for the solvent extraction of soluble components from ground coffee beans to form a liquid coffee extract which comprises introducing ground coffee into a first vessel, pumping liquid coffee extract into the first vessel to form a feed slurry with the ground coffee, introducing feed slurry under pressure to the lower part of a second and vertically oriented vessel, causing the coffee solids to flow upwardly therein as a moving bed, introducing solvent at superambient temperature and pressure into the upper part of the second vessel, removing a part of the introduced solvent and spent solids from the upper part of the second vessel, separating the removed spent solids from the removed solvent and recycling the solvent to the upper part of the first vessel, a portion of the solvent introduced into the second vessel flowing downwardly therein countercurrently to the moving bed of coffee solids to extract the solubles therefrom, removing extract from the lower part of the second vessel at such a rate as to settle solids out of the feed slurry closely adjacent the point of introduction of the feed slurry, and introducing a portion of the extract into the first vessel.

4. A continuous process for the solvent extraction of soluble components from ground coffee beans to form a liquid coffee extract which comprises introducing ground coffee into a first vessel, pumping liquid coffee extract into the first vessel to form a feed slurry with the ground coffee, introducing feed slurry under pressure to the lower part of a second and vertically oriented vessel, causing the coffee solids to flow upwardly therein as a moving bed, introducing solvent at superambient temperature and pressure into the upper part of the second vessel, removing a part of the introduced solvent and spent solids from the upper part of the second vessel and introducing them into the upper part of a third vessel, flowing fresh hot solvent countercurrently to the spent solids in the third vessel, discharging solids from the lower part of the third vessel and introducing solvent from the upper part of the third vessel to the upper part of the second vessel, separating the removed spent solids from the removed solvent and recycling the solvent to the upper part of the first vessel, a major portion of the solvent introduced into the second vessel flowing downwardly therein countercurrently to the moving bed of coffee solids to extract the solubles therefrom, removing extract from the lower part of the second vessel at such a rate as to settle solids out of the feed slurry closely adjacent the point of introduction of the feed slurry, and introducing a portion of the extract into the first vessel.

5. A continuous process for the solvent extraction of soluble components from ground coffee beans to form a liquid coffee extract which comprises introducing a feed slurry of fresh ground coffee beans and liquid coffee extract under pressure to the lower part of a vertically oriented extraction vessel, causing the coffee solids to flow upwardly therein as a moving bed, introducing solvent at superambient temperature and pressure into the upper part of the extraction vessel, removing a part of the introduced solvent and spent solids from the upper part of the extraction vessel, washing the removed solids with fresh solvent, separating the removed spent solids from the solvent and introducing the solvent to the upper part of the first vessel, a portion of the solvent introduced into the second vessel flowing downwardly therein countercurrently to the moving bed of coffee solids to extract the solubles therefrom, and removing extract from the lower part of the second vessel.

6. A continuous process for the solvent extraction of soluble components from ground coffee beans to form a liquid coffee extract which comprises introducing a feed slurry of fresh ground coffee beans and liquid coffee extract under pressure to the lower part of a vertically oriented extraction vessel, causing the coffee solids to flow upwardly therein as a moving bed, introducing solvent at superambient temperatures and pressure into the upper part of the extraction vessel, removing spent solids from the upper part of the extraction vessel, solvent introduced into the extraction vessel flowing downwardly therein countercurrently to the moving bed of coffee solids to extract the solubles therefrom, introducing additional solvent into at least one additional part of the extraction vessel intermediate the upper and lower part of the vessel, and removing extract from the lower part of the extraction vessel.

7. A continuous process for the solvent extraction of soluble components from ground coffee beans to form a liquid coffee extract which comprises introducing a feed slurry of fresh ground coffee beans and coffee extract under pressure to the lower part of a vertically oriented extraction vessel, causing the coffee solids to flow upwardly therein as a moving bed, introducing solvent at superambient temperature and pressure into the upper part of the extraction vessel, removing spent solids from the upper part of the extraction vessel, the solvent introduced into the extraction vessel flowing downwardly therein countercurrently to the moving bed of coffee solids to extract the solubles therefrom, removing a portion of the solvent from at least one intermediate point in the extraction vessel, changing the temperature of the removed solvent by indirect heat exchange and reintroducing it into the extraction vessel at approximately the point of withdrawal so as to alter the temperature equilibrium within the vessel in the region in which the solvent is reintroduced, and removing extract from the lower part of the extraction vessel.

8. A continuous process for the solvent extraction of soluble components from ground coffee beans to form a liquid coffee extract which comprises pumping a slurry of liquid coffee extract and ground coffee at superambient temperature and pressure into one end of an extraction column, causing the ground coffee to settle out of the slurry so as to move through the column as a moving granular bed, introducing solvent at superambient temperature and pressure into the opposite end of the extraction column, removing spent solids from said opposite end of the extraction column as a slurry with part of the introduced solvent, the remaining part of the solvent flowing in the extraction column countercurrently to the moving bed of coffee solids to extract the solubles therefrom, and removing extract from the end of the column opposite the point of solvent introduction, and reintroducing a portion of the extract into the column as the liquid phase of the feed slurry.

9. A continuous process with a solvent extraction of soluble components from ground coffee beans to form a liquid coffee extract which comprises introducing ground coffee into a first vessel, pumping liquid coffee extract into the first vessel to form a feed slurry with the ground coffee, introducing feed slurry under pressure to one end of a second and vertically oriented vessel causing the ground coffee to flow through the vessel as a moving granular bed, introducing solvent at superambient temperature and pressure into the opposite end of the second vessel, removing spent solids from said opposite end of the second vessel as a slurry with a part of the introduced solvent the remaining part of the solvent introduced into the second vessel flowing through the vessel countercurrently to the moving bed of coffee solids to extract the solubles therefrom, removing extract from the first end of the second vessel, and reintroducing a portion of the extract into the first vessel as the liquid phase of the feed slurry.

References Cited in the file of this patent

UNITED STATES PATENTS

| 2,381,965 | Berry | Aug. 14, 1945 |
| 2,562,563 | McBean | July 31, 1951 |
| 2,629,663 | Fogler et al. | Feb. 24, 1953 |
| 2,731,424 | Shabaker | Jan. 17, 1956 |
| 2,949,364 | Bilenker | Aug. 16, 1960 |

FOREIGN PATENTS

| 752,367 | Great Britain | July 11, 1956 |